United States Patent
Lin

(10) Patent No.: US 9,172,932 B2
(45) Date of Patent: Oct. 27, 2015

(54) VIDEO SIGNAL PATHS SWITCHING IN A PORTABLE DISPLAY SYSTEM

(75) Inventor: Chi-Hung Lin, Hsinchu (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 526 days.

(21) Appl. No.: 13/544,898

(22) Filed: Jul. 9, 2012

(65) Prior Publication Data

US 2014/0009691 A1    Jan. 9, 2014

(51) Int. Cl.
*H04N 9/31* (2006.01)
*G06F 3/14* (2006.01)
*G06F 1/16* (2006.01)

(52) U.S. Cl.
CPC ............ *H04N 9/3188* (2013.01); *G06F 1/1639* (2013.01); *G06F 3/14* (2013.01); *G06F 3/1431* (2013.01); *G06F 3/1438* (2013.01)

(58) Field of Classification Search
CPC ....... G06F 1/1639; G06F 3/14; G06F 3/1431; G06F 3/1438; H04N 9/3188
USPC .......................................... 353/122; 348/552
See application file for complete search history.

(56) References Cited

U.S. PATENT DOCUMENTS

| | | | | |
|---|---|---|---|---|
| 7,663,633 B1 * | 2/2010 | Diamond | ................... | G06F 3/14 345/502 |
| 8,078,767 B2 * | 12/2011 | Kotani | ................... | G03B 21/00 710/14 |
| 8,346,986 B2 * | 1/2013 | Kotani | ................... | G03B 21/00 710/14 |
| 8,589,597 B2 * | 11/2013 | Adachi | ............................ | 710/15 |
| 8,736,618 B2 * | 5/2014 | Redman | ................ | G06F 3/1438 345/502 |
| 8,800,021 B1 * | 8/2014 | Swaminathan et al. | ........ | 726/11 |
| 8,941,668 B2 * | 1/2015 | Diamond | ................... | G06F 3/14 345/501 |
| 2005/0097469 A1 * | 5/2005 | Kasashima | .................... | 715/718 |
| 2008/0018789 A1 * | 1/2008 | Lin | ........................... | G06F 3/14 348/552 |
| 2008/0212267 A1 * | 9/2008 | Brosilovski et al. | .......... | 361/679 |
| 2009/0290298 A1 * | 11/2009 | Hsieh et al. | .............. | 361/679.27 |
| 2010/0011285 A1 * | 1/2010 | Kawata | .................. | G06F 3/0481 715/246 |
| 2010/0014007 A1 * | 1/2010 | Kotani | ................... | G03B 21/00 348/744 |
| 2011/0164368 A1 * | 7/2011 | Leng | ........................ | G03B 29/00 361/679.21 |
| 2011/0267359 A1 * | 11/2011 | Redman | ................ | G06F 3/1438 345/502 |
| 2012/0144070 A1 * | 6/2012 | Kotani | .................... | G03B 21/00 710/8 |
| 2013/0061271 A1 * | 3/2013 | Lu | ................................... | 725/74 |
| 2013/0179562 A1 * | 7/2013 | Lee et al. | ...................... | 709/224 |

* cited by examiner

*Primary Examiner* — Bao-Luan Le
(74) *Attorney, Agent, or Firm* — McClure, Qualey & Rodack, LLP

(57) ABSTRACT

An image projection system includes a scaler IC, a micro-projector, a video connector, and a controller. The video connector is coupled to the scaler IC and the micro-projector. The controller controls the video connector and the scaler IC to form a first signal path mode and a second signal path mode. The video connector transmits a first image signal from the scaler IC for external displaying in the first signal path mode. The video connector receives a second image signal from a peripheral device and passes the second image signal to the micro-projector for projection in the second signal path mode.

14 Claims, 5 Drawing Sheets

VIDEO SIGNAL PATHS SWITCHING IN A PORTABLE DISPLAY SYSTEM

BACKGROUND

1. Technical Field

The disclosure relates to image projection system and image projection method.

2. Related Art

An all-in-one (AIO) computer system and a notebook may be implemented with a projection unit. Such computer systems having projection function can be treated as a projection system and project the image or display the image as a choice by user. However, there are many computer systems without projection function still in use. The computer system without projection function is not able to project image.

FIG. 1 is a drawing, schematically illustrating a conventional computer system without projection function. In FIG. 1, a conventional computer system includes a main processing unit 100 and a display device 102. The main processing unit 100 usually has a scaler IC 104 and outputs image data to the display device 102, such as a display panel or a LCD monitor, via the video connector 106 and a video cable. Such computer system has no projection function, so it cannot display the image by projection manner.

FIG. 2 is a drawing, schematically illustrating a conventional computer system with projection function. In FIG. 2, the computer system with projection function includes a main processing unit 100' and a display device 102. The main processing unit 100' can have the function as described in FIG. 1. In addition, the main processing unit 100' includes a micro-projector 108, so that the main processing unit 100' can pass the image data to the micro-projector 108 for projecting the image, which is to be displayed by the computer system.

In conventional computer system, although some computer systems, such as AIO computer system and notebook, has the projection function. This projection function is just used in the individual computer system. In other words, the projection function of the micro-projector 108 in FIG. 2 is not used by the computer system in FIG. 1 for projecting image. This may cause inconvenient operation.

SUMMARY

An image projection system and an image projection method have been introduced herein. The image projection system and the image projection method allow a peripheral device, which has no projection function, to use a micro-projector, which has already been implemented in a computer system.

An image projection system includes a scaler IC, a micro-projector, a video connector, and a controller. The video connector is coupled to the scaler IC and the micro-projector. The controller controls the video connector and the scaler IC to form a first signal path mode and a second signal path mode. The video connector transmits first image signals from the scaler IC for external displaying in the first signal path mode. The video connector receives second image signals from a peripheral device and passes the second image signals to the micro-projector for projection in the second signal path mode.

An image projection method is implemented in an image projection system, which has a scaler integrated circuit (IC), a micro-projector, a video connector, and a controller. The method includes controlling the video connector and the scaler IC by the controller to have a first signal path mode, wherein the video connector transmits first image signals from the scaler IC for external displaying in the first signal path mode. In addition, the method controls the video connector and the scaler IC by the controller to have a second signal path mode, wherein the video connector receives second image signals from a peripheral device and passes the second image signals to the micro-projector for projection in the second signal path mode.

Several exemplary embodiments accompanied with figures are described in detail below to further describe the disclosure in details.

DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION

Figure 1:
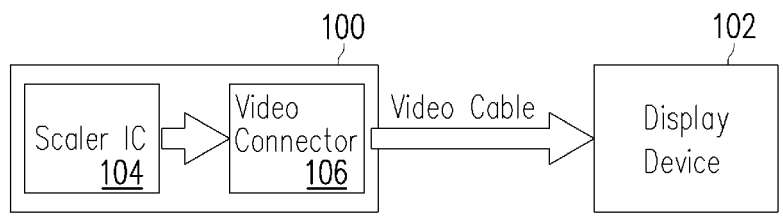
FIG. 1 is a drawing, schematically illustrating a conventional computer system without projection function.
Figure 2:
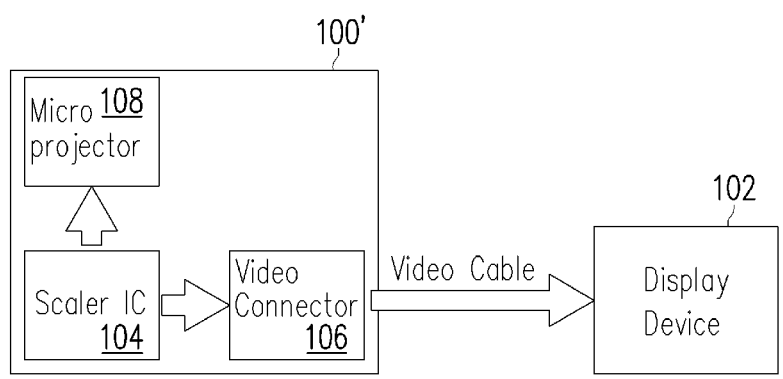
FIG. 2 is a drawing, schematically illustrating a conventional computer system with projection function.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the present invention, an image projection system having the projection function, such as an AIO computer system or a computer system already implemented with micro-projector, can allow a peripheral system to directly use the projection function to display the image. In this manner, a computer system without projection function can conveniently use the projection function of another computer system, which has already implemented with projection function.

Figure 3:
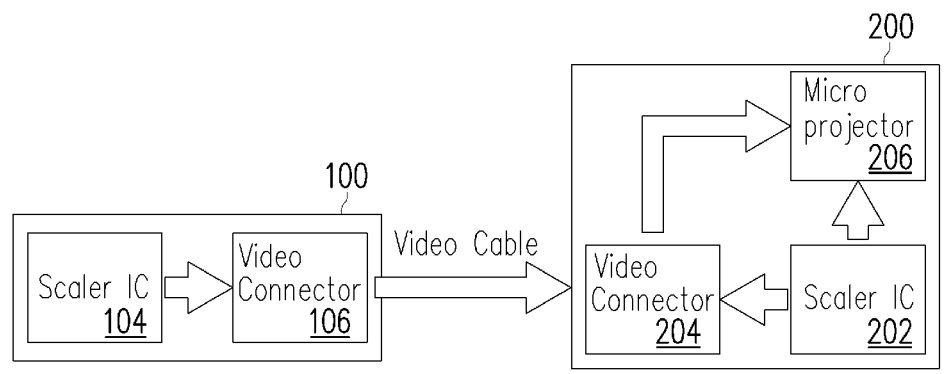
FIG. 3 is a drawing, schematically illustrating a computer system with projection function when a peripheral computer system intends to use the projection function, according to an embodiment of the present invention.

FIG. 3 is a drawing, schematically illustrating a computer system with projection function when a peripheral computer system intends to use the projection, according to an embodiment of the present invention. In FIG. 3, the main processing unit 100 of a usual computer system in FIG. 1 may intend to use the micro-projector 206 of a main processing unit 200 of an image projection system, such as AIO computer or a computer implemented with the micro-projector. The computer system with projection function is taken as an example of a general image projection system for later descriptions.

The main processing unit 200 includes a scaler IC 202, a video connector 204 and a micro-projector 206. The video connector 204 can be controlled by the computer system to transmit or receive image signals. It should be noted that the video connector in the conventional system is just used for transmitting the image data from the scaler IC to the display device. However, in the present invention, the video connector 204 under controlled by the computer system can also receive the image signals to directly pass the image signals to the micro-projector 206 for projecting the image.

The scaler IC 202 operating in a normal operation mode, that is also a first signal path mode, may send image signals to the external display device via the video connector 204 and the video cable. The scaler IC 202 can also send the image signals to the micro-projector 206 for projecting the image. When the scaler IC 202 is operated in a second signal path mode, the computer system changes the signal path, so that the image signals from the main processing unit 100 of the peripheral computer system can be inputted to the main processing unit 200 and passed to the micro-projector 206. The control to change the signal path can be done by any proper manner, such as a switching function. As a result, the scaler IC 202 does not send image signal to the micro-projector 206 and the scaler IC 202 does not transmit image signals out via the video connector 204 since the video connector 204 is used for receiving image signals from the peripheral computer system. A signal path between the video connector 204 and the micro-projector 206 can be used to directly pass the image signals to the micro-projector 206. In general, the scaler IC 202 should be controlled in the computer system not to interfere with the input image signals. Embodiments for control are to be further described later.

Figure 4:
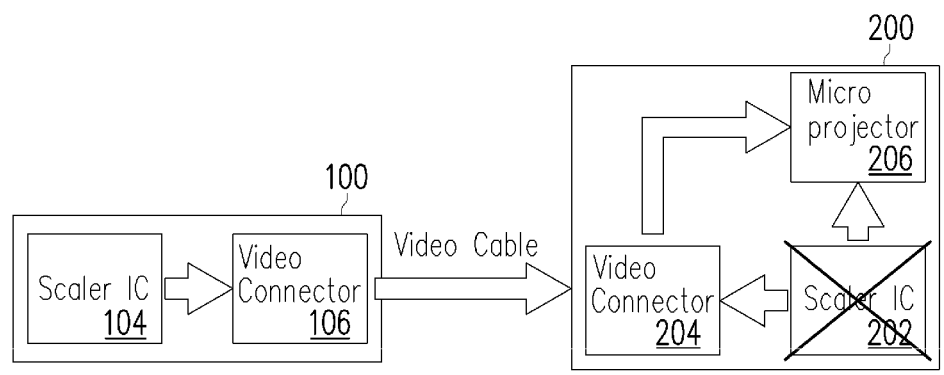
FIG. 4 is a drawing, schematically illustrating a computer system with projection function when a peripheral computer system intends to use the projection function when the computer system is at a standby state, according to an embodiment of the present invention.

FIG. 4 is a drawing, schematically illustrating a computer system with projection function when a peripheral computer system intends to use the projection function when the computer system is at a standby state, according to an embodiment of the present invention. In FIG. 4, for some situation, the computer system with projection function may be at a standby state. However, the peripheral computer system can still use the power at the standby state and then uses the micro-projector 206 to project the image. So, as indicated in FIG. 4, the scaler IC 202 is at off state and does not send image signals out. Since the standby power still exists in the main processing unit 200 of the computer system, the micro-projector 206 can still be used without turning on the scaler IC 202.

Figure 5:
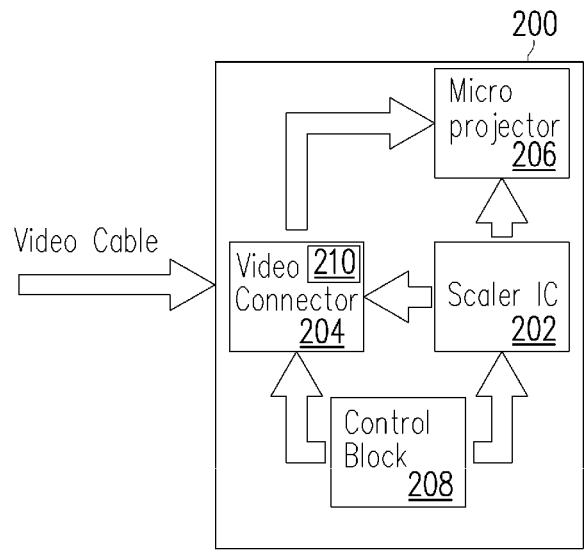
FIGS. 5-9 are drawings, schematically illustrating a circuit structure of a main processing unit under different operation states, according to embodiments of the present invention.

FIG. 5 is a drawing, schematically illustrating a circuit structure of a main processing unit under different operation state, according to embodiments of the present invention. In FIG. 5, as an example, the computer system may include a control block 208 to control the scaler IC 202 and the video connector 204. The video connector 204 may also includes a switching device 210 so as to accordingly change the connection to the micro-projector 206 or the scaler IC 202.

Figure 6:
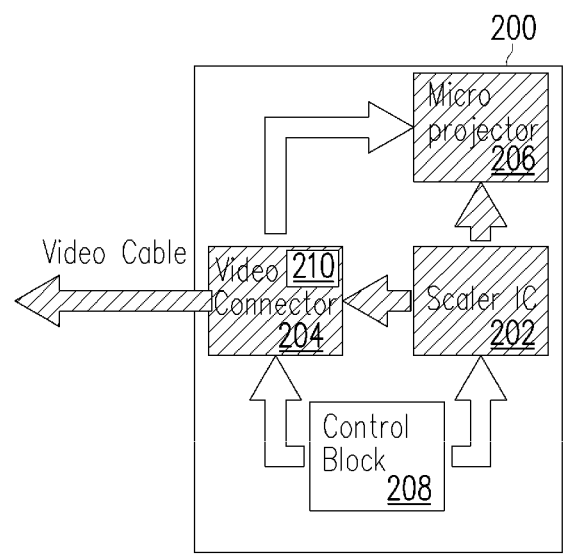

FIG. 6 is a drawing, schematically illustrating a circuit structure of a main processing unit under different operation state, according to embodiments of the present invention. In FIG. 6, in the normal operation mode, the scaler IC 202 under controlled by the control block 208 can transmit image signal to the external peripheral display device or to the micro-projector 206. The shaded signal path is shown. The video connector 204 with the switching device 210 is at a connection state to the scaler IC 202 for transmitting image signals out via the video connector 204 and the video cable. The switching device 210 is for example controlled by the control block 208 for setting the connection.

Figure 7:
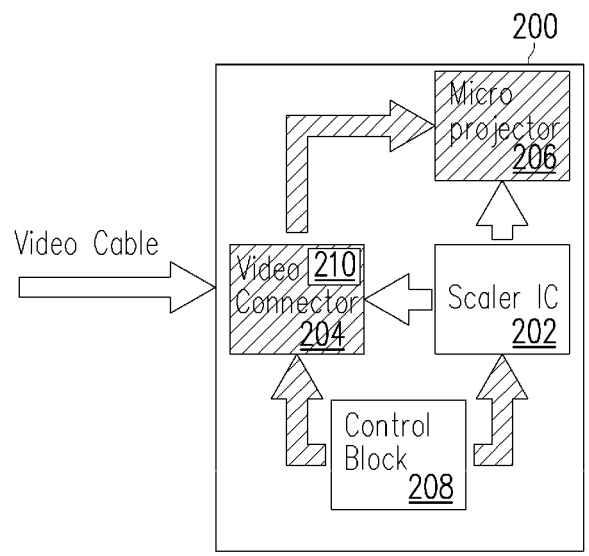

FIG. 7 is a drawing, schematically illustrating a circuit structure of a main processing unit under different operation state, according to embodiments of the present invention. In FIG. 7, as the signal path indicated by shading, when the micro-projector 206 of the main processing unit 200 of the computer system is to be used by the peripheral apparatus, such as the peripheral computer system, to project the image, the video connector 204 with the switching device 210 is controlled by the control block 208 to set connection to the micro-projector 206, so that the inputted image signals can be passed to the micro-projector 206. However, to avoid signal interference, the control block 208 also informs or controls the scaler IC 202 not to send image signals to the video connector 204 and the micro-projector 206.

Preferably, the computer system may have a display device, such as a LCD monitor. When the control block 208 informs or controls the scaler IC 202 not to send image signals to the video connector 204 and the micro-projector 206 so that the peripheral apparatus can use the micro-projector 206 to project image, the scaler IC 202 can transmit image signal to the display device. Under this condition, the computer system can show the image by the display device while the peripheral apparatus uses the micro-projector 206 to show the image signal from the peripheral apparatus at the same time.

Figure 8:
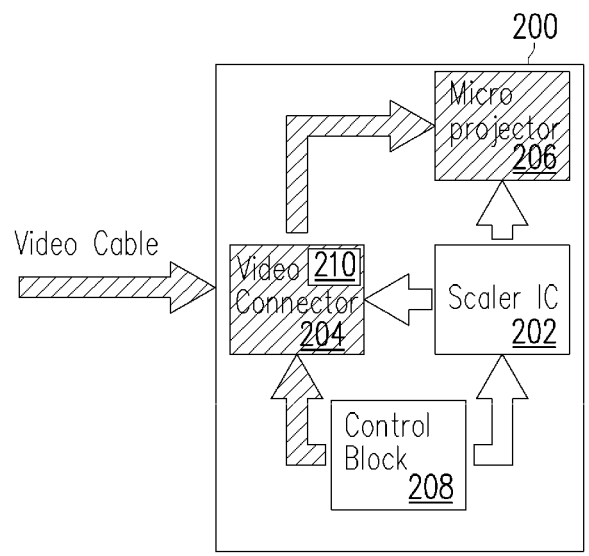

FIG. 8 is a drawing, schematically illustrating a circuit structure of a main processing unit under different operation state, according to embodiments of the present invention. In FIG. 8, however, the computer system may be at a standby state, in which the scaler IC 202 is off and only the standby power remains. In this situation, as indicated by shading, the control block 208 can control the video connector 204 with the switching device 210, so as to pass the inputted image signals to the micro-projector 206 for projecting the image. In other words, even if the computer system is at the standby state, the micro-projector can still use the standby power to project image from the peripheral device.

Figure 9:
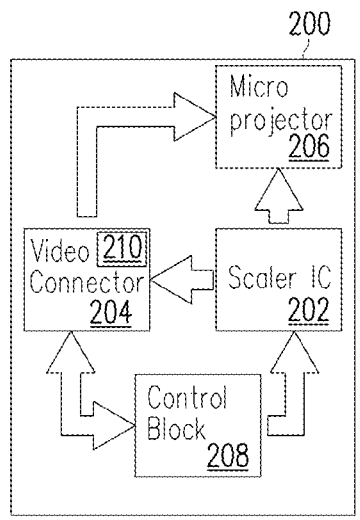

FIG. 9 is a drawing, schematically illustrating a computer system with projection function, according to embodiments of the present invention. In FIG. 9, in alternative manner, since the image signals to be projected by the micro-projector 206 are in different form from the signals outputted from the scaler IC 202, the control block 208 may also automatically detect whether or not the image signals are input from the video connector 204 to be projected on the micro-projector 206. The image signals to be projected usually have the vertical synchronization signal, and are different from the image data, which are to be transmitted to display device. Based on the signal difference in form, the control block 208 can automatically detect and switch the signal path to the micro-projector 206.

Figure 10:
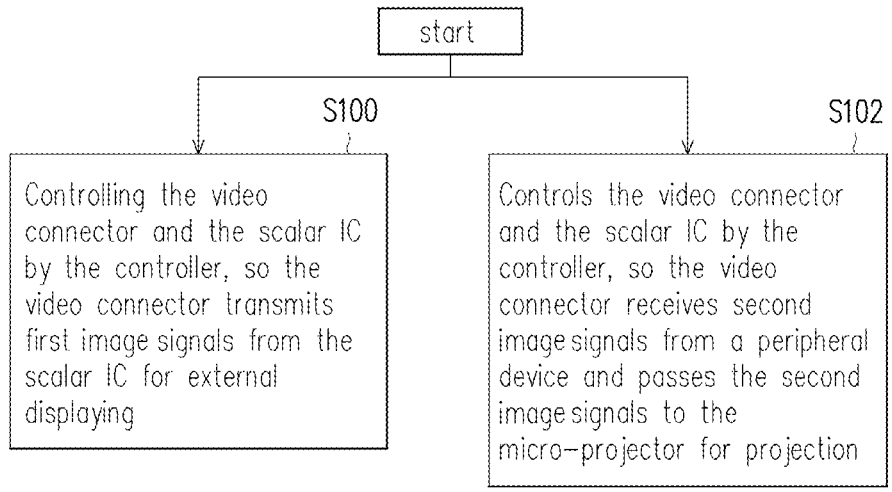
FIG. 10 is a drawing, schematically illustrating an image projection method, according to embodiments of the present invention.

FIG. 10 is a drawing, schematically illustrating an image projection method, according to embodiments of the present invention. The image projection method can be implemented in an image projection system, which has a scaler integrated circuit (IC), a micro-projector, a video connector, and a controller. After starting the method, the method includes step S100 for controlling the video connector and the scaler IC by the controller to have a first signal path mode. The video connector transmits first image signal from the scaler IC for external displaying in the first signal path mode. In addition, the method in step S102 can also control the video connector and the scaler IC by the controller to have a second signal path mode, wherein the video connector receives second image signal from a peripheral device and passes the second image signal to the micro-projector for projection in the second signal path mode. It can be noted that the step S100 and the step S102 can be alternatively switched according to the actual operation in need.

In the image projection method, the controller switches the video connector to connect to the scaler IC in the first signal path mode and connect to the micro-projector in the second signal path mode.

In the image projection method, when used in the second signal path mode, the controller stops the scaler IC from sending the first image signal to the video connector and the micro-projector. And the scaler IC can send the first image signal to a display device of the image projection system so that the first image can be shown on the display device while the second image is projected from the micro-projector at the same time.

In the image projection method, when used in the first signal path mode, the controller stops the video connector from sending the first image signal to the micro-projector.

In the image projection method, when used in the first signal path mode, the scaler IC can also send third image signal to the micro-projector.

In the image projection method, when used in the second signal path mode, whether the scaler IC is set at either an operation state or a standby state, a power is still provided to the micro-projector by the image projection system.

In the image projection method, when the scaler IC is at standby state, the controller detects whether or not the second image signals are received by the video connector and controls the video connector and the scaler IC to the second signal path mode.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An image projection system, comprising:
   a scaler integrated circuit (IC);
   a micro-projector;
   a video connector, coupled to the scaler IC and the micro-projector; and
   a controller, controlling the video connector and the scaler IC to form a first signal path mode and a second signal path mode,
   wherein in the first signal path mode, the scaler IC transmits a first image signal to the video connector for external displaying on an external display device,
   wherein in the second signal path mode, the video connector receives a second image signal from a peripheral device and directly passes the second image signal to the micro-projector for projection by the micro-projector and the controller stops the scaler IC from sending the first image signal to the video connector and micro-projector.

2. The image projection system of claim 1, wherein the video connector comprises a switching device under controlled by the controller to connect the video connector to the scaler IC in the first signal path mode and connect the video connector to the micro-projector in the second signal path mode, wherein in the second signal path mode, the video connector is not connected to the scaler IC.

3. The image projection system of claim 1, wherein when used in the first signal path mode, the controller stops the video connector from sending the first image signal to the micro-projector.

4. The image projection system of claim 1, wherein when used in the first signal path mode, the scaler IC can also send a third image signal to the micro-projector.

5. The image projection system of claim 1, wherein when used in the second signal path mode, whether the scaler IC is set at an operation state or a standby state, a power is still provided to the micro-projector by the image projection system.

6. The image projection system of claim 1, wherein when the scaler IC is at a standby state, the controller detects whether or not the second image signal is received by the video connector and controls the video connector and the scaler IC to the second signal path mode.

7. The image projection system of claim 1, wherein the image projection system has a display device and in the second signal path mode, the display device displays a fourth image signal from the image projection system while the micro-projector projects the second image signal.

8. An image projection method, implemented in an image projection system, which has a scaler integrated circuit (IC), a micro-projector, a video connector, and a controller, the method comprising:
   controlling the video connector and the scaler IC by the controller to have a first signal path mode, wherein the scaler IC transmits a first image signal to the video connector for external displaying on an external display device in the first signal path mode; and
   controlling the video connector and the scaler IC by the controller to have a second signal path mode, wherein the video connector receives a second image signal from a peripheral device and directly passes the second image signal to the micro-projector for projection by the micro-projector in the second signal path mode and the controller stops the scaler IC from sending the first image signal to the video connector and micro-projector.

9. The image projection method of claim 8, wherein the controller switches the video connector to connect to the scaler IC in the first signal path mode and connect to the micro-projector in the second signal path mode, wherein in the second signal path mode, the video connector is not connected to the scaler IC.

10. The image projection method of claim 9, wherein when used in the first signal path mode, the controller stops the video connector from sending the first image signal to the micro-projector.

11. The image projection method of claim 9, wherein when used in the first signal path mode, the scaler IC sends a third image signal to the micro-projector.

12. The image projection method of claim 9, wherein when used in the second signal path mode, whether the scaler IC sets at an operation state or a standby state, a power is still provided to the micro-projector by the image projection system.

13. The image projection method of claim 9, wherein when the scaler IC is at a standby state, the controller detects whether or not the second image signal is received by the video connector and controls the video connector and the scaler IC to the second signal path mode.

14. The image projection method of claim 8, wherein the image projection system has a display device and in the second signal path mode, the display device displays a fourth image signal from the image projection system while the micro-projector projects the second image signal.

* * * * *